Patented May 14, 1940

2,200,712

UNITED STATES PATENT OFFICE 2,200,712

ARYL PHOSPHITES

Thomas S. Carswell, Glendale, Mo., assignor to Monsanto Chemical Company, St. Louis, Mo., a corporation of Delaware No Drawing. Application November 15, 1937, Serial No. 174,653

8 Claims. (Cl. 260—461)

This invention relates to new esters of phosphorous acid and more particularly to aryl phosphites.

Among the principal objects of this invention is the provision of new aryl phosphites possessing particular value as chemical adjuvants to be added to oils and greases and when so added to yield a lubricant which is substantially non-corrosive.

It has been found that compounds of the type exemplified by the benzyl-substituted phenyl phosphites may be prepared by the reaction of phosphorous trichloride and the corresponding phenol. For example, p-benzyl phenol may be reacted with a substantially theoretical amount of $PCl_3$ to form the crude para ester, which may be purified by dilution with benzene and extraction with NaOH solution. Similarly, o-benzyl phenol may be reacted with a substantially theoretical quantity of $PCl_3$ to form the corresponding crude ortho ester, which may be purified in the same manner. However, for economic reasons it is usually preferable to prepare a mixture of the ortho and para isomers by utilizing a mixture of ortho and para benzyl phenol since such a product is entirely suitable for the purposes outlined below. These compounds may also be prepared by reacting under anhydrous conditions the sodium salt of benzyl phenol with phosphorous trichloride. This is preferably carried out in an anhydrous, inert medium, e. g., toluene. In this case the sodium chloride formed separates from the solution. The solvent may be removed preferably by distillation at reduced pressure. High temperatures are to be avoided.

A specific example illustrating the method of preparing the benzyl-substituted phenyl phosphites follows:

To 1138 parts of a mixture of ortho and para benzyl phenol at 50° C. are added 275 parts of phosphorous trichloride and the reaction mixture is heated at 130–140° C. for 4 hours. From 90–95% of the chlorine will then have been evolved as HCl. A vacuum is then applied for one to two hours to complete the reaction. The ester is recovered from the reaction mass by diluting with an organic solvent such as benzene and extraction of the free phenol and acid esters with NaOH solution. The benzene is then removed by heating under a vacuum, the removal being accelerated if desired by the use of an entraining liquid such as a stream of dry nitrogen. The o-p-benzyl phenyl phosphite, which is obtained in an 86% yield, is an oily, viscous liquid at ordinary temperatures.

It is preferable to use a small excess of phenol (e. g., 2–10%) to insure complete conversion of the $PCl_3$ to the tri ester. If the benzyl phenyl phosphorous dichloride is desired, it may be prepared by using a large excess of $PCl_3$.

Other benzylated phenols may be employed in a similar manner to prepare the corresponding phosphites. For instance, a benzyl cresol may be reacted with a substantially equivalent amount of phosphorous trichloride and the corresponding benzyl cresyl phosphite will be obtained in good yield. Likewise, a mixed ester may be prepared by reacting a mol of $PCl_3$ with less than three mols of a benzyl phenol and reacting the resulting ester with another phenol in quantity sufficient to evolve the remaining chlorine as HCl. Such mixed esters as well as the phosphites of the higher benzyl phenols have properties analogous to those of the simple benzyl phenyl phosphites.

The benzyl-substituted phenyl phosphites or mixtures of two or more of them have been found to be valuable adjuvants to be added to oils and greases.

Recent advances in automotive engine design have tended toward higher bearing pressures, higher speeds of rotation and higher engine temperatures. Such changes have caused a departure from the usual metals employed for bearings and the adoption of harder materials, such as cadmium-silver, cadmium-nickel, copper-lead alloys or the like. Concurrently with this change to the new bearing materials a demand has arisen for oils having a higher viscosity index, i. e., a smaller change in viscosity with change in temperature. This demand has been met by improved methods of refining which have made possible a greatly improved product. Unfortunately, however, these improved oils have been found to be definitely corrosive toward the new bearing materials which, although they are harder than the older type such as babbitt, are much more susceptible to such attack.

It has been found that when the compounds forming the subject-matter of this invention are admixed with oils and greases in quantities as small as one-tenth of 1% or even less, the tendency to corrode the newer type bearings otherwise shown by such oil or grease is substantially completely prevented. In addition it has been found that the admixture of these compounds with oils and greases increases the film strength of the resulting product and reduces the amount of wear normally occurring when the bearing is in use over what is encountered when the oil or grease alone is used. There are also indications that the amount of carbon formed is reduced. In many cases it may be preferable to use a mixture of two or more of the benzyl-substituted phenyl phosphites and at times it may be desirable to incorporate them in quantities as large as 1% or more with certain oils. In fact 4% or 5% may be employed where the object is to increase the film strength although much smaller amounts will prevent corrosion.

When the compounds of this invention or mixtures thereof are employed for the purposes outlined, it has been found that they do not impart an objectionable odor such as "carbolic acid" to the product. The derivatives of phenols previously employed for analogous purposes are subject to this objection and the widespread complaints of customers who objected to such an odor have severely limited their application.

What is claimed is:
1. The tri benzyl-substituted phenyl phosphites.
2. Tri (o-benzyl phenyl) phosphite.
3. Tri (p-benzyl phenyl) phosphite.
4. The ester reaction product of $PCl_3$ and a benzyl-substituted phenol.
5. The ester reaction product of $PCl_3$ and a phenol, at least a substantial portion of which is a benzyl phenol.
6. The ester reaction product of $PCl_3$ and a benzyl cresol.
7. The tri benzyl substituted cresyl phosphites.
8. The mixed ester reaction product obtained by the reaction of a mol of $PCl_3$ with less than 3 mols of a benzyl phenol and reacting the resulting ester with another phenol in quantity sufficient to evolve the remaining chlorine as HCl.

THOMAS S. CARSWELL.